United States Patent [19]

Torigian

[11] Patent Number: 4,700,727

[45] Date of Patent: Oct. 20, 1987

[54] METHOD OF TREATING LETTUCE AND OTHER LEAFY VEGETABLE PLANTS AND PRODUCTS PRODUCED THEREFROM

[75] Inventor: Puzant C. Torigian, Fort Lee, N.J.

[73] Assignee: Challenger Industries, Ltd., Fort Lee, N.J.

[21] Appl. No.: 811,333

[22] Filed: Dec. 20, 1985

[51] Int. Cl.[4] .......................... A24B 15/20; A24B 1/18
[52] U.S. Cl. .................................... 131/369; 131/308; 131/359; 131/372
[58] Field of Search ................ 131/369, 372, 308, 359

[56] References Cited

U.S. PATENT DOCUMENTS

| | | | |
|---|---|---|---|
| 3,106,209 | 10/1963 | Torigian | 131/369 |
| 3,194,245 | 7/1965 | Clarke | 131/372 |
| 4,407,307 | 10/1983 | Gaisch et al. | 131/308 |

Primary Examiner—V. Millin
Attorney, Agent, or Firm—Jacobs & Jacobs

[57] ABSTRACT

Lettuce and leafy vegetables are processed and enzymatically treated with proteolytic or amylolytic enzymes under predetermined temperature and pH conditions for the production of tobaccoless smokes and edible products such as pita-like pockets and chips which may be treated with desired flavoring and coloring ingredients.

14 Claims, No Drawings

METHOD OF TREATING LETTUCE AND OTHER LEAFY VEGETABLE PLANTS AND PRODUCTS PRODUCED THEREFROM

BACKGROUND OF THE INVENTION

It is known to treat lettuce under controlled pH, temperature and humidity conditions to produce a non-tobacco innocuous replacement for conventional tobacco cigarettes while providing user with the activity of smoking and inhaling and exhaling. In my U.S. Pat. Nos. 3,106,209 and 3,367,043, I have described procedure for the enzymatic hydrolysis of lettuce leaves for the above purpose and which after treatment are generally similar in physical appearance to commercial tobacco cigarettes since the treated lettuce leaves can be formed by means of the usual cigarette-making machinery into standard cigarette or rod-like shape and the resultant tobacco-less cigarettes made in accordance with the procedure of my said patents can if desired have flavoring, coloring and other materials such as odor-imparting materials applied thereto either on the surface or by impregnation during manufacture.

I have now discovered a significantly improved procedure for treating lettuce and leafy vegetables and plants, in particular lettuce and plants of the genus Lactuca as well as members of the genera Claytonia and Valerianella to produce a variety of useful products. Preferably, I employ cultivated lettuce in the form of head lettuce of the variety *Lactuca sativa capitata* all of which botanical classifications will hereinafter be collectively termed lettuce and leafy vegetable plants.

THE PRESENT INVENTION

According to the present invention methods are provided for treating lettuce and leafy vegetable plants to produce useful products therefrom which may vary in nature in that the procedure is capable of producing not only non-tobacco non-toxic "cigarette" but alternatively dietary or nutritional products.

In general, the lettuce and leafy vegetable plants are subjected to controlled hydrolysis in one form of the invention in order to produce partially cured vegetable or leafy matter which can be converted into fibrous shreds by any suitably known shredder, such as a Waring blender, or disintegration and which are then subjected to the addition or incorporation of coloring and taste-imparting materials. These fibrous shreds can then be fed to a conventional cigarette-making machine to produce non-tobacco smokes having the appearance and taste satisfaction of tobacco but being completely free from irritant tobacco, thereby producing a tobaccoless smoke which does not have the harmful or toxic effects of the nicotine present in conventional cigarettes or the puffs of smoke therefrom. Additionally, or alternatively, the fibrous shreds can be shaped and converted into discs or a low calorie bulk various flavored snack food useful as pita bread or pockets or into lettuce chips of potato-chip-like form and nature.

The present invention provides improved procedure as contrasted with my aforesaid patents and involves the use of newly developed technology for the production of inexpensive, non-tobacco "smoking" fibers or fibrous shreds utilizing a non-labor-intensive process for harvesting, curing, processing and producing a series of products which are consistently more uniform and desirable in color, taste, odor and texture. In the case of non-tobacco smoking products, the procedure involves the alteration of the constituents of the starting material, i.e. the lettuce or other leafy vegetable plant, by controlled hydrolysis to obtain the desired degree of conversion while simultaneously adjusting texture and color of the resultant products and, as set forth above, one such product is similar in appearance and physical form to tobacco fibrous shreds and the rod-shaped non-tobacco "cigarettes" formed therefrom. It is an important feature of my invention to control the parameters of the hydrolysis (and bleaching and deodorizing) in order to obtain the desired color, consistency, odor and appearance and to provide fibrous shreds or leaf-like or disc-shaped products which can be employed in a variety of ways.

The invention is more specifically set forth by the following examples:

EXAMPLE 1

A freshly washed head of lettuce is pulped in any suitable equipment such as a food processor or a high speed wet-material shredder, by means of either of which a substantially uniform fibrous mass is obtained in a semi-fluid state, e.g. as a thick slurry. The fibrous shreds thus produced are substantially homogenous having dimensions of about 20-200 microns in length, 20-25 microns in thickness and 40-80 microns in width and, if necessary, water can be added to the food processor or shredding equipment to obtain the desired fluidity. The fluid mass is then treated with an organic detergent such as saponin or a synthetic surfactant such as sodium lauryl sulfate or a number of proprietary penetrating or surface-tension-reducing substances, e.g. Tweens, Spans, Tergitol, or Aerosol 07 which have anionic and/or cationic and/or non-ionic chemical (terminal) groupings.

The resultant fluid mass is then slightly acidified with lactic, acetic, malic or hydrochloric acid until the pH value is about 3-6 and then sufficient sodium hypochlorite solution is slowly added during agitation of the fluid mass to produce a desired off-white or brownish color. The amount of acid and/or sodium hypochlorite varies with the particular variety of the lettuce or leafy vegetable and its moisture, color or other condition due to the location and climatic conditions during growth and especially its maturiy when harvested.

The foregoing mixture is allowed to steep for about 1-12 hours while gradually raising the temperature to about 80° C. The resulting mass is then expressed as by squeezing or compression through any suitable equipment such as a Sharples-type separator to reduce the water content or may be filtered under conditions which remove most of the moisture. The residue is shaped into a thin sheet or ribbon which is approximately paper thin. The paper thin product may be made in commercial quantities on any suitable equipment used for high volume production such as a Fourdrinier machine or on a smaller scale when desired or in a laboratory by a sheet-making frame vacuum box, as well as by a Buchner or other type funnel with a suitable coarse filter cloth.

The thus expressed product is then re-suspended in water to a thick, creamy consistency and recast one or more times until undesired soluble salts are removed, at which point a small amount of hydrogen peroxide solution (6%) is added in the ratio of 1 oz. to each 10 gallons of fluid. When the peroxide has dissipated, which usually involves a time period of about 15 minutes to three hours depending on temperature and specific acidity, the mixture is adjusted to a pH in the range of 3.5 to 8.4 using lactic, acetic, malic or hydrochloric acid or an alkali such as sodium, potassium or ammonium hydroxide or an alkaline material such as ethylene diamine. At this stage, a mixture of proteolytic and amylolytic enzymes is added to the fluid mass under warming to about 35° C. and a pH of about 4.5-7.5 according to the amount of enzymes and their concentration. Preferably a proteolytic enzyme is used but an amylolytic enzyme of fungal or bacterial origin may be used to break down by enzymatic hydrolysis the protein matter present to amino acids and starches and to various sugars.

The processed mass has pleasant taste and odor characteristics even when burned and the enzyme mixtures which are used can simulate specific flavors such as those reminiscent of aromatic foods such as chicory, banana, apple, maple syrup and honey. In addition, pulps of unprocessed fluids and vegetables or herbs may be added to the fluid mass to create blends and bouquets of particular tastes and aromas.

The above mass is again expressed and dried to about 12% moisture and then further treated by spraying thereon or dipping thereinto suitable flavoring materials composed of plant extracts or synthetic imitations thereof to develop the desired taste and burning aroma when non-tobacco cigarettes are being produced. The thus treated material is brought to a moisture level of about 16% and when a smoking "cigarette" replacement is to be produced, the resultant fibrous sheets are adjusted as to moisture level to accommodate the type of equipment used in converting the shreds to "cigarette"-like rod shape.

It has been found that the mixture should be corrected or adjusted as to its moisture level to permit spraying a flavoring material thereon which contains volatiles to replace those partially or wholly lost during the heating or moisture-reducing steps.

EXAMPLE 2

A head of washed lettuce is pulped and maintained in fluid condition by adding up to its own weight of water but when the head of lettuce is produced hydroponically, little or no washing is generally required. The resulting mass is now brought to a boil and expressed as above and cooled to ambient temperature. The pulp produced is re-suspended in water and treated with enzymes as explained in Example 1. The enzyme or enzyme mixture may be varied in nature or proportions in order to hydrolyze the proteins and complex carbohydrates which were denatured during the heating process.

EXAMPLE 3

The expressed pulp as initially obtained above in Example 1 is autoclaved at 10 lbs. for 30 minutes and then fluidized with water and cooled to about 35°-40° C. prior to treating with enzymes as above. Fibers, discs or non-tobacco smokes can then be produced from the resultant product.

EXAMPLE 4

The expressed pulp as initially obtained according to Example 1 is microwaved to nearly complete dryness and the mass re-suspended and treated as above. Fibers, discs or non-tobacco smokes can then be produced from the resultant product.

EXAMPLE 5

Collard greens are pulped in the same manner described above and treated with a 5% ammonia water solution (1 oz. per gallon of pulped mixture) and then allowed to stand for a period of ½ to 12 hours. The thus treated pulp is then expressed and re-suspended in water, following which it is neutralized with hydrochloric acid, lactic acid, malic acid, citric acid or acetic acid to a pH of about 7± and thereafter treated with sodium hypochlorite solution or alkalinized water to bleach the fibers which are then again expressed and re-suspended with the addition of a small amount of sodium thiosulfate which is added to eliminate any residual chlorine. The resulting product is then treated with the enzyme solutions described above to attain the desired odor, flavor or taste.

EXAMPLE 6

The treated pulped mass of lettuce as initially obtained according to Example 1 is treated with peroxide solution (6%) or with yeast or a mixture of tartaric acid and bicarbonate of soda and then expressed in such manner that it has a thickness of approximately ½" and is in the physical shape of discs of 3-12" in diameter, which discs are dried by exposing them to microwaves as in a microwave oven or hot air oven of the type used for making pizzas, and the resulting product is similar to a pita-type edible food with a crust and a central cavity which can be filled or stuffed with other foods to make a snack. The snack can if desired by sprayed with an oil such as an edible vegetable oil and placed in a very hot oven for a length of time sufficient to form edible chips.

EXAMPLE 7

The pulped mass obtained as described above is expressed and then dried to a moisture content of about 10% but is otherwise untreated and the resulting product is useful for making agricultural nursery germination pots having seeds implanted therein and which can be activated to germinate and grow in the same container by the addition of water. Instead of the pots, sheets "decorated" with seeds of various colored flowers may be utilized, and additional nutrients and growth hormones such as gibberelic acid and rooting hormones may be added which facilitate seedlings and transplanting without disturbing the plant, since the roots will grow through a nutriated lettuce of vegetable pulp pot or laid on fine soil as a roll.

EXAMPLE 8

A head of lettuce is pulped in the manner described above in equipment simulating a food processor in which the degree of shredding and pulping can be controlled to produce long strands of fiber to which there must be added water during the pulping process in order to facilitate the mobility of the pulp mass. This mass is then collected on a filter or its fluid separated by a centrifugal separator such as a standard Sharples separator and the pulp is then re-suspended in water and again expressed to remove excess fluids. In its re-suspended state a bleaching agent such as dilute hypochloric acid is added dropwise, which results in obtaining a tan or brownish color simulating the appearance of tobacco. Thereafter, the re-suspended and bleached material is again expressed and washed with water in which it becomes re-suspended and a suitable enzyme mixture of the type referred to above is added according to the kind of lettuce or other vegetable matter and the climatic conditions during growth such as temperature and moisture variations, rainfall, winds, altitude, season and fertilizers. The pH value and the temperature of reaction are then adjusted to secure the most favorable conditions for the desired product being produced. After the enzymatic reaction is allowed to progress to the desired extent, the pulped mass is again expressed and thereafter collected in a container or vessel. The flavoring agents are then incorporated by means of a liquid composed of a humectant such as glycerin, propylene glycol or sorbitol and then a 1-2% alkaline aginate solution, e.g. sodium, potassium or ammonium alginate, is added and the resulting mass is sufficiently fluidized to permit it to be rolled out like dough or cast on a stainless steel belt that can be heated to remove the moisture (Sandvik Corp.). The resultant sheet of controlled thickness is then shredded in a manner like tobacco leaf is shredded and thereafter or simultaneiously can be surface flavored to provide a fine smoking product.

The invention thus comprises procedure for treating lettuce and leafy vegetable plants to produce a variety of products useful as a tobacco or "cigarette" replacement in a number of physical forms and shapes as well as edible pita-like, potato chip-like and other baked and unbaked snacks or foods.

What is claimed is:

1. A method of treating lettuce and leafy vegetable plants to produce tobaccoless smokes therefrom which comprises washing and shredding untreated lettuce and leafy vegetables and subjecting the shreds to the action of enzymes which break down their proteinaceous content, adjusting the moisture and temperature thereof and slightly acidifying the resulting shreds to a pH value of 3-6 and then imparting to the resulting material a desired color, taste, odor and physical form.

2. A method according to claim 1 wherein the processed shreds are colored and flavored to impart the appearance of tobacco thereto by converting the shredded, enxymatically treated lettuce and leafy vegetables into a dough-like mass and forming a sheet, ribbon or disc therefrom of reduced moisture content, the resultant products being provided with a pleasant taste and odor.

3. A method according to claim 1 wherein the non-tobacco smokes are shaped into the form of cylindrical rods in which the shreds are contained in a wrapper physically resembling "cigarettes" after having treated the pulped lettuce or leafy vegetable plants by controlled hydrolysis optionally in the presence of a surfactant to attain the consistency color and appearance of tobacco to which a desired flavor and odor is imparted.

4. A method according to claim 1, wherein the lettuce or leafy vegetable is converted to a creamy aqueous pulp, undesired solids and moisture are removed by expressing and filtration to achieve the desired consistency and a small amount of $H_2O_2$ is added, thereafter the resulting product is adjusted to a pH of 3.5-8.4, a proteolytic or amylolytic enzyme or a mixture thereof in any suitable proportions is added and the resulting mass is warmed to about 35° C. after which the moisture content is stabilized at about 12%.

5. A method according to claim 4, wherein the enzyme or mixture of enzymes is caused to break down the proteins present to amino acids and starches which are convertible to starches and sugars respectively.

6. A tobaccoless smoke produced from the lettuce and leafy vegetables according to claim 1.

7. A method according to claim 1 wherein when discs are produced they are shaped to a thickness of about $\frac{1}{2}''$ and a diameter of about 3-12" and are then subsequently shaped to form products of edible nature.

8. A method of making tobaccoless smokes from lettuce and leafy vegetable plants which comprise washing and shredding such previously untreated lettuce and leafy vegetable plants to produce a substantially uniform fibrous mass, adding sufficient water to obtain desired fluidity, treating the mass with an organic detergent or an ionic surfactant, acidifying the resultant mass with acid to adjust the pH value to about 3-6 and slowly adding sufficient sodium hypochlorite solution while agitating the mass until the desired off-white or brownish coloration is acquired, steeping the mixture so produced for about 1-12 hours while gradually raising the temperature to about 80° C. and expressing the resulting mass to reduce the water content until the mass is semi-dry, shaping the semi-dry mass into a paper-thin sheet, disc or ribbon, resuspending the expressed product in water to a thick, creamy consistency and then recasting it to remove undesired soluble salts, adding a 6% aqueous solution of hydrogen peroxide, allowing the hydrogen peroxide to dissipate, adjusting the pH of the resultant product to 3.5-8.4 and adding a mixture of proteolytic and amylolytic enzymes to the fluid mass and warming the same to about 35° C. at a pH of about 4.5-7.5 to break down the proteinaceous matter present by enzymatic hydrolysis and convering the thus processed material into shreds suitable for forming into non-tobacco cigarettes.

9. A method according to claim 8 wherein the organic detergent is saponin, sodium lauryl sulphate or an ionic surfactant and acidification is carried out with lactic, acetic, malic or hydrochloric acid.

10. A method according to claim 8 wherein the semi-fluid mass is expressed a second time until the moisture content is about 12% and subsequently further treating said mass by the step of spraying thereon or applying thereto flavoring materials composed of plant extracts or synthetic imitations thereof to develop a desired pleasant taste and burning aroma when the non-tobacco cigarettes are smoked.

11. A method according to claim 10 wherein the product produced by the spraying or applying step is brought to a moisture content of about 16% and converted to fibrous sheets hydrophobic-hydrophilic in nature and suitable for conversion to the shreds used in making cigarette like, rod-shaped material.

12. A method according to claim 8 wherein the washed lettuce or leafy vegetable plant is pulped and maintained in fluid condition by addition of an equal weight of water, bringing the fluid mass to a boil and expressing the mass and cooling it to ambient temperature and treating the same with enzymes as defined in claim 8.

13. A method according to claim 8 wherein the expressed pulp is autoclaved under a pressure of 10 psi for about 30 minutes and then fluidized with water and cooled to about 35°-40° C. preparatory to the enzymatic treatment of claim 8 and thereafter producing therefrom fibers to be formed into non-tobacco smokes.

14. A method according to claim 8 wherein the expressed pulp is autoclaved under a pressure of 10 psi for about 30 minutes and then fluidized with water and cooled to about 35°-40° C. preparatory to the enzymatic treatment of claim 7 and then producing therefrom semi-dry discs of paper-like thickness.

* * * * *